Feb. 3, 1970    J. G. RABATIN    3,493,515
RECRYSTALLIZATION OF YTTRIUM VANADATE LUMINESCENT MATERIALS
Filed May 2, 1966

Inventor:
Jacob G. Rabatin
by Richard H. Burgess
His Attorney ns # United States Patent Office 3,493,515
Patented Feb. 3, 1970

3,493,515
RECRYSTALLIZATION OF YTTRIUM VANADATE
LUMINESCENT MATERIALS
Jacob G. Rabatin, Chardon, Ohio, assignor to General
Electric Company, a corporation of New York
Filed May 2, 1966, Ser. No. 547,047
Int. Cl. C09k 1/44; H01p 3/16
U.S. Cl. 252—301.4                                   5 Claims

ABSTRACT OF THE DISCLOSURE

This invention relates to an improved process for the production of yttrium vanadate luminescent materials activated with europium. More specifically, it concerns a process for improving the crystallinity, particle size and shape characteristics, and brightness of such materials.

---

Figure 1:
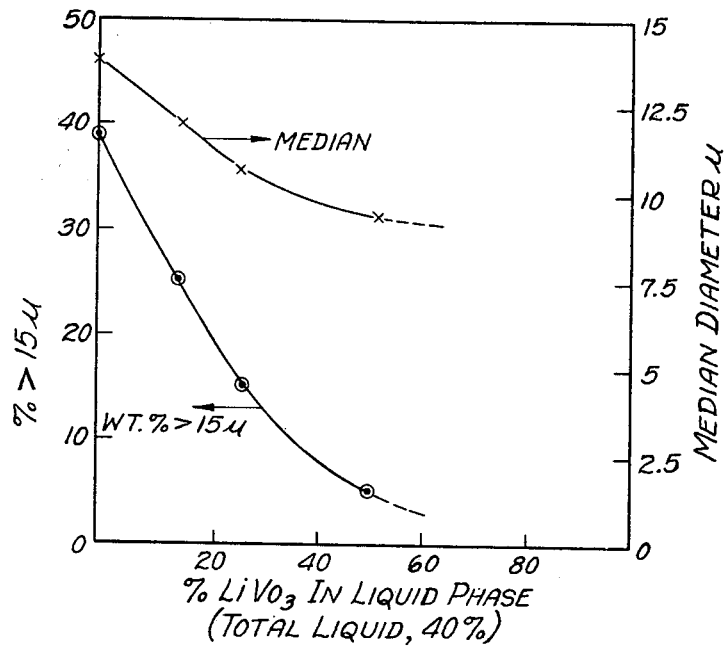

Yttrium orthovanadate activated with europium, $YVO_4$:Eu or $(Y,Eu)VO_4$, is useful as a luminescent material or phosphor for providing the red component of light output in cathode-ray tubes such as in conventional color television systems and for use in lamps such as for color-improvement of the naturally bluish light output of mercury discharge lamps. This involves both cathodo-luminescence in cathode-ray tubes and photoluminescence in lamp applications. Furthermore, such materials have been found to be useful in the production of coherent light in laser systems.

In the production of light, the crystallinity and particle size and shape of the phosphor powder are important factors which often have significant effects on light output as well as on the utility of the phosphor in terms of ability to produce coatings for lamps or arrays of phosphor dots for color television tubes.

It is known that large crystals of yttrium orthovanadate can be grown from liquid phase or bath vanadium pentoxide, $V_2O_5$, in excess of the amount required for the preparation of the stoichiometric compound. (Percentages herein are by weight except where indicated otherwise.) However, further improvements in the light output and applicability characteristics of such luminescent materials are constantly being sought.

It is an object of the present invention to provide a method for producing yttrium vanadate luminescent materials activated with europium having improved crystallinity and particle size and shape over that which can be readily obtained by processes of the prior art.

Another object of the present invention is to provide such a process for producing such luminescent materials characterized by the stated improvements and having luminescent characteristics at least equivalent to those previously available.

A further object is to achieve such improvements in a more economical manner.

Further objects and advantages will appear from the following detailed description of species thereof and from the accompanying drawings.

Briefly stated, the present invention in one form provides for the inclusion of lithium vanadate, $LiVO_3$, in partial or complete substitution for the excess $V_2O_5$ as bath-producing constituents for the production of a melt in which the phosphor crystals are crystallized or re-crystallized (both procesess are referred to herein as re-crystallization) upon heating the batch to a sufficiently high temperature and holding it at that temperature for the time necessary to produce the desired crystals. After the crystal growth, the melt is cooled to solidify the bath constituents, which are then removed from the crystals of yttrium vanadate activated with europium such as by lixiviating with NaOH, filtering, washing with water and drying. The liquid portion which is the bath is at least 5 percent and preferably in the range of 5 to 50 percent based on or relative to the yttrium vanadate activated with europium. Different effects can be achieved by varying the ratio of $LiVO_3$ to excess $V_2O_5$ in the bath-producing constituents; the preferable range of proportions is from about 5 to 100 percent or 5 to 50 percent of the liquid composition as $LiVO_3$, the balance if any being $V_2O_5$. Compounds which decompose or react to product $LiVO_3$ and $V_2O_5$ such as lithium carbonate, $Li_2CO_3$, and ammonium metavanadate, $NH_4VO_3$, are equivalent to $LiVO_3$ and $V_2O_5$ for purposes of the invention. Such compounds producing $LiVO_3$ or $V_2O_5$ are calculated herein as the equivalent amounts of $LiVO_3$ or $V_2O_5$ since that is the form in which they take part in the process of the invention.

Turning now to the drawing, FIG. 1 is a graphical representation of the effect of varying the proportion of $LiVO_3$ in the liquid phase on the particle size characteristics of the resultant phosphor produced under specified conditions.

Figure 2:
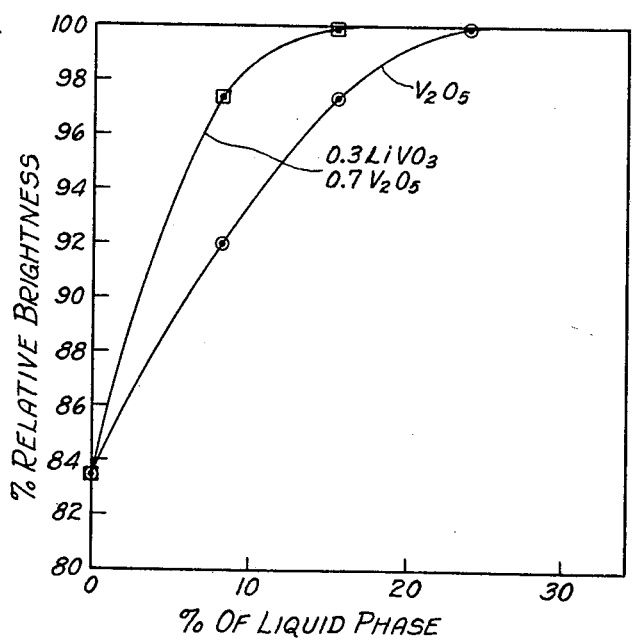

FIG. 2 is a graph illustrating the effect on relative brightness of resultant phosphors of varying percentages of a recrystallization bath of the invention as compared with one of the prior art.

Yttrium vanadate:europium materials may be provided for firing or recrystallization in accordnace with the present invention by either of two processes known to the art.

Powdered $Y_2O_3$, $Eu_2O_3$ and $V_2O_5$ can be dry-blended together in the desired proportions.

Alternatively, an yttrium-europium oxide, $(Y, Eu)_2O_3$, may be mixed in the form of finely ground dry powder with $V_2O_5$ or $NH_4VO_3$. In this case, the $V_2O_5$ blended into the $(Y, Eu)_2O_3$ powder may have two purposes. Part of it will be material required for the production of the phosphor itself, and another portion of the $V_2O_5$ blended into this powder may be part or all of the $V_2O_5$ constituent of the bath-producing materials. The $LiVO_3$ may be added in the same manner at the same time or separately. The mixed yttrium-europium oxide may be obtained by co-precipitating a mixed oxalate from solution in nitric acid by adding a solution of oxalic acid in excess with agitation. The precipitate is an yttrium-europium oxalate, $(Y, Eu)_2 (C_2O_4)_3$ containing several molecules of water of recrystallization which can be fired in air at about 1000–1100° C. to produce $(Y, Eu)_2O_3$ to be blended with the $V_2O_5$.

By means of hot-stage microscopy applicant has observed the process of the present invention. During the heating, at about 600° C., the $(Y,Eu)_2O_3$ and $V_2O_5$ react to form aggregated masses of very fine particles of $(Y,Eu)VO_4$. At about 674° C., the excess $V_2O_5$ melts and thoroughly wets the aggregates of fine particles of $$(Y,Eu)VO_4$$

Above 700° C. the aggregated particles begin to recrystallize through the solution to form the well-crystallized, regular-polyhedron particles which are desired. Apparently the recrystallization process takes place through the liquid phase by classical means with certain particles (perhaps the larger or more perfect crystal) which have lower surface free energy forming nuclei for the deposition of yttrium-europium vanadate from other particles of higher surface free energy which more readily dissolves in the melt. The solubility of yttrium-europium vanadate in liquid $V_2O_5$ plus $LiVO_3$ seems to be quite low but at a level which is very desirable for the operation of this process.

From tests with the high temperature microscope, applicant has found that the system $YVO_4$–$V_2O_5$ has a eutectic composition af at least 98% $V_2O_5$. When 25% $LiVO_3$ is substituted for an equivalent amount of $V_2O_5$, the solubility of (Y,Eu)VO$_4$ remains essentially constant but the eutectic temperature is lowered by about 30° C. Supercooling effects make measurement of the precise eutectic temperature difficult. This lowering of the eutectic temperature is beneficial in aiding the reaction, and the slight solubility of yttrium vanadate in the liquid is shown by the eutectic compostion.

Similar phenomena operate in recrystallization liquids consisting of excess V$_2$O$_5$ without LiVO$_3$, but the resulting particle size distributions and aggregations of the produced phosphors are inferior. As one hypothesis for the superiority of LiVO$_3$-containing recrystallization baths, it may be that lithium substantially reduces the viscosity of the solution, and thereby favors the more rapid dissolution of the smaller particles of yttrium-europium vanadate and the deposition of such material on larger crystals in a way such as to minimize aggregation or sticking together of discrete particles.

The ternary system (Y,Eu)VO$_4$-V$_2$O$_5$-LiVO$_3$ containing at least about 5% LiVO$_3$ behaves in a manner quite different from the binary system (Y,Eu)VO$_4$-V$_2$O$_5$ insofar as the recrystallization process and the characteristics of the resultant product are concerned. Pure LiVO$_3$ substituted for the V$_2$O$_5$ of the prior art seems to require longer firing times but does produce the advantages of the invention, although different materials for reaction vessels are desirable, such as using platinum rather than vitreous silica. This may be more economically feasible in the production of laser crystals.

As an example of the process of the present invention, one of a series of experiments which were performed will now be described. 11.8 grams of (Y,Eu)$_2$O$_3$ were blended with 15.7 grams of V$_2$O$_5$ and 1.00 grams of LiVO$_3$ to produce a phosphor and a recrystallization bath which is calculated to be 35% by weight of the phosphor. At high temperature this forms a liquid containing 12.5% LiVO$_3$ and 87.5% V$_2$O$_5$. The batch was fired at 950° C. for 1½ hours in a silica crucible. The batch was then cooled, crushed and washed in hot NaOH solution for one hour at about 90° C., filtered, washed free of NaOH and the dissolved bath constituents, and then dried at about 120° C. The resulting powder phosphor was then sifted through a fine-mesh screen.

Brightness and particle size measurements of products made in this manner with varying LiVO$_3$-V$_2$O$_5$ proportions were made, and the results are presented in Table I. The brightness measurements are given in percentages of an arbitrary standard and were made on screens with optimum weight of phosphor in a manner that is known to the art. Particle size data was obtained with the Coulter Counter. The procedure may be readily modified by changes in proportions and amounts to obtain varying proportions and compositions of the liquid phase in which the recrystallization takes place.

TABLE I

| Sample No. | Percent LiVO$_3$ in 35% bath | Relative Brightness | Median Dia., μ | Wt. percent >15μ |
|---|---|---|---|---|
| 1 | 0 | 107 | 13.8 | 39 |
| 2 | 12.5 | 108 | 12.4 | 27 |
| 3 | 25.0 | 107 | 11.5 | 15 |
| 4 | 50.0 | 106 | 9.0 | 5 |
| 5a | 100.0 | 105 | 12.0 | 10 |
| 6b | 12.5 | 107 | 8.4 | 3 |
| 7c | 12.5 | 109 | 7.3 | 2 | a 5 was fired 4 hours at 950° C.
b 6 had 25% total bath and was fired 1½ hours at 950° C.
c 7 had 25% total bath and was fired 4 hours at 850° C.

The test results presented in Table I indicate that a desirable and substantial reduction in agglomeration as measured in terms of median diameter and weight percent of the particles over 15 microns in diameter results with increasing LiVO$_3$ in the recrystallization liquid when the total amount of liquid is 35%.

Table II demonstrates from a new series of examples that a substantial improvement in the brightness and agglomeration occurs as the LiVO$_3$ concentration in the liquid increases from 5 to 10 percent.

TABLE II

| Sample No. | Percent LiVO$_3$ in 35% bath | Relative Brightness | Median Dia., μ | Wt. percent >15μ |
|---|---|---|---|---|
| 11 | 5 | 104 | 15.4 | 56 |
| 12 | 10 | 108 | 10.4 | 13 |

FIG. 1 illustrates the effects of varying the proportion of LiVO$_3$ in the liquid phase on the particle size characteristic phosphor. The left-hand ordinate is weight percent of the particles greater than 15 microns in diameter, and the right-hand ordinate is median diameter. The data in each table and each figure were obtained separately on samples produced from the same lots of starting materials in order to insure comparability. Of times, minor variations in such properties as purity of the starting materials from lot to lot may affect the comparability of data from one table to another.

To investigate the effect of varying the percentage of recrystallization medium or bath, tests were performed with 8% and 15% bath-producing materials with both 100% V$_2$O$_5$ and 30% LiVO$_3$-70% V$_2$O$_5$ compositions. The resulting data on brightness, median diameter and weight percent over 15 microns are presented in Table III. FIG. 2 demonstrates that considerably less liquid may be used to obtain the same results in brightness when LiVO$_3$ is a constituent of the V$_2$O$_5$ bath. There is an economic benefit in addition to quality benefits in using added LiVO$_3$ in accordance with the invention.

TABLE III

| Sample No. | Recrystallization Medium | Relative Brightness | Median Dia., μ | Wt. percent >15μ |
|---|---|---|---|---|
| 21 | V$_2$O$_5$ (8%) | 96 | 17.0 | 65 |
| 22 | 30%LiVO$_3$-70%V$_2$O$_5$ (8%) | 102 | 15.3 | 27 |
| 23 | V$_2$O$_5$ (15%) | 103 | 14.1 | 43 |
| 24 | 30%LiVO$_3$-70%V$_2$O$_5$ (15%) | 105 | 11.6 | 18 |

A preferred composition of phosphor produced according to the present invention is (V$_{0.95}$Eu$_{0.05}$)VO$_4$, and the quantities of other rare earth materials and other impurities should be controlled as is known in the art.

Variations in the ingredients added to the batch can be made including the following: LiVO$_3$ may be added as Li$_2$CO$_3$ which reacts with V$_2$O$_5$ at about 400° C. to form LiVO$_3$; NH$_4$VO$_3$ may be substituted for an equivalent amount of V$_2$O$_5$, decomposing on heating in air to V$_2$O$_5$ at about 300° C.; and at 600° C. Y$_2$O$_3$ and Eu$_2$O$_3$ or (Y,Eu)$_2$O$_3$ react with V$_2$O$_5$ to form (Y,En)VO$_4$. In like manner, other starting materials than oxides may be used to provide the yttrium and europium. At the recrystallization temperature and above 600° C. the systems become identical, regardless of which combination of these or other equivalent starting materials has been used.

Comparative results using other recrystallization systems, namely: NaVO$_3$-V$_2$O$_5$ and KVO$_3$-V$_2$O$_5$ are presented in Table IV. The liquid phase consisted of 25% MVO$_3$(M=Li, Na, or K) 75% V$_2$O$_5$ with a total of 40% liquid present. Otherwise, the procedures were identical.

TABLE IV

| Sample No. | Liquid System | Relative Brightness | Median Dia., μ | Wt. percent, 15μ |
|---|---|---|---|---|
| 31 | LiVO$_3$-V$_2$O$_5$ | 108 | 11.5 | 15 |
| 32 | NaVO$_3$-V$_2$O$_5$ | 93 | 11.6 | 13 |
| 33 | KVO$_3$-V$_2$O$_5$ | 95 | 9.3 | 4 |

These results demonstrate that although the systems NaVO$_3$-V$_2$O$_5$ and KVO$_3$-V$_2$O$_5$ are effective in reducing the percentage over 15 microns diameter compared to V$_2$O$_5$ alone the brightness is substantially less than achieved with LiVO$_3$-V$_2$O$_5$. Thus, it can be concluded that because of some yet unknown intrinsic properties the system LiVO$_3$-V$_2$O$_5$ is quite unique in achieving both high brightness and desirable particle size characteristics.

What I claim as new and desire to secure by Letters Patent of the United States is:

1. A method for producing crystalline luminescent materials of yttrium vanadate activated with europium comprising the following steps:

providing a batch comprising: (i) the constituents required for stoichiometric production of the desired composition, and (ii) bath-producing materials in amounts of at least 5 weight precent relative to the yttrium vanadate activated with europium, said bath-producing materials consisting essentially of $LiVO_3$, $LiVO_3$ plus $V_2O_5$, or materials which decompose or react to produce $LiVO_3$ or $V_2O_5$, the proportions of $LiVO_3$ to $V_2O_5$ or materials which decompose or react to produce $LiVO_3$ or $V_2O_5$, calculated in the form of $LiVO_3$ and $V_2O_5$, being from about 5 to 100 weight percent $LiVO_3$, the balance if any $V_2O_5$, heating said batch to a temperature sufficient to melt said bath-producing materials and cause recrystallization of the constituent materials of said phosphor, and holding said batch at such temperature for a long enough time to produce the desired size of crystals of yttrium vanadate activated with europium, cooling said batch to solidify said bath-producing materials, and removing said bath-producing materials to produce improved crystals of yttrium vanadate activated with europium.

2. The process of claim 1 wherein recrystallization is performed at a temperature above about 700° C.

3. The process of claim 1 in which said $V_2O_5$ is provided in the form of $NH_4VO_3$.

4. The process of claim 1 in which the weight percentage of bath-producing materials relative to the yttrium vanadate activated with europium is from about 5 to about 50 percent by weight, and in which said bath-producing materials contain about 30% by weight $LiVO_3$, the balance being $V_2O_5$.

5. The process of claim 1 wherein recrystallization is performed at a temperature in the range of 700–1200° C. to 1 to 4 hours.

References Cited

UNITED STATES PATENTS

| | | | |
|---|---|---|---|
| 3,152,085 | 10/1964 | Ballman et al. | 252—301.4 |
| 3,357,925 | 12/1967 | Levine et al. | 252—301.4 |
| 3,360,480 | 12/1967 | Martin et al. | 252—301.4 |
| 3,380,926 | 4/1968 | Harper | 252—301.4 |

OTHER REFERENCES

On the Luminescent Properties of the Rare Earth Vanadates—L. H. Brixner et al., J. Electrochem. Soc. 112, 70–74, (January 1965).

TOBIAS E. LEVOW, Primary Examiner

ROBERT D. EDMONDS, Assistant Examiner